E. A. REEVES.
VALVE.
APPLICATION FILED FEB. 13, 1907.
932,494.
Patented Aug. 31, 1909.
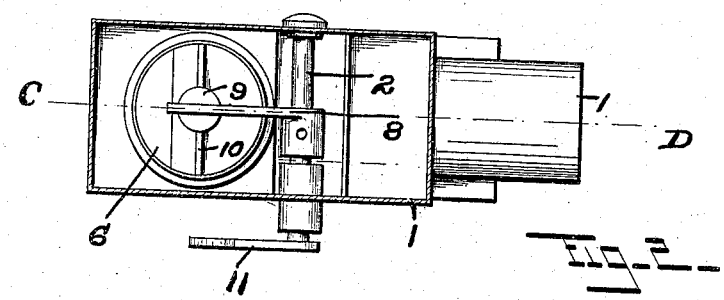
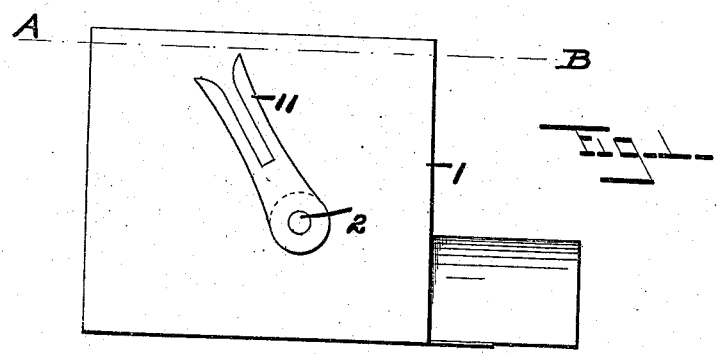
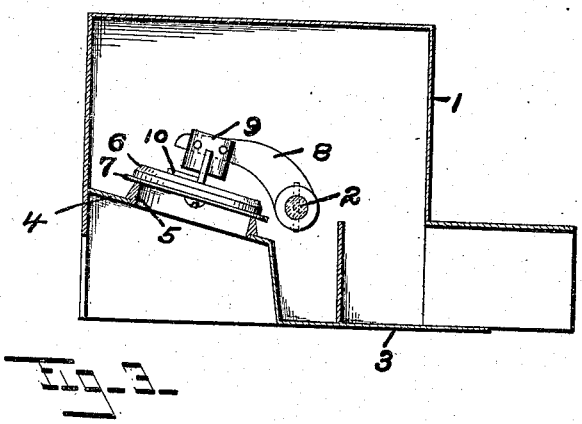
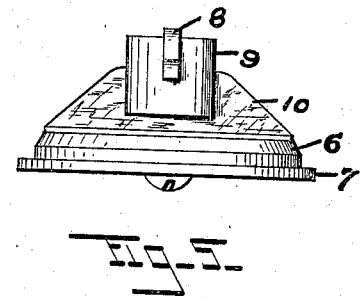
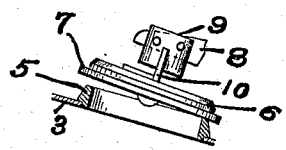
Witness
Florence H. Monk.
Gertrude Brethauer.
Inventor
Edwin A. Reeves
by George C. Hall
Attorney

UNITED STATES PATENT OFFICE.

EDWIN A. REEVES, OF BRIDGEPORT, CONNECTICUT.

VALVE.

932,494.

Specification of Letters Patent.   Patented Aug. 31, 1909.

Application filed February 13, 1907.   Serial No. 357,135.

*To all whom it may concern:*

Be it known that I, EDWIN A. REEVES, a citizen of the United States, residing at Bridgeport, in the county of Fairfield and State of Connecticut, have invented certain new and useful Improvements in Valves, of which the following is a specification, reference being had therein to the accompanying drawings.

My invention relates to new and useful improvements in valves, having for its object, among other things, the construction of a valve which may be closed gradually and thus provide a port with a continually varying area.

To these, and other ends, my invention consists in the valve having certain details of construction and combinations of parts as will be hereinafter described and more particularly pointed out in the claim.

Referring to the drawings, in which like numerals of reference designate like parts in the several figures; Figure 1 is an elevation of a casing inclosing my improved valve mechanism; Fig. 2 is a sectional plan view thereof upon line A—B of Fig. 1; Fig. 3 is a sectional elevation thereof upon line C—D of Fig. 2; Fig. 4 is a fragmentary view showing the relative positions of the valve disk and seat as the disk first engages the seat; and Fig. 5 is an enlarged front view of the valve disk and adjacent parts.

My invention is especially designed, although not limited to such use, for automatic prepayment gas meters, the valve being arranged so as to close gradually and permit a decreasing quantity of gas to pass therethrough to maintain a dim light for practically an indefinite period instead of closing the valve instantly and shutting off the gas supply without warning.

In the practice of my invention, as the same is applied to a gas meter, a casing 1, preferably of sheet metal, is provided, having a shaft 2 rotatably mounted therein, and a floor 3 having an inclined portion 4 with the valve ring 5 fixed therein, the upper surface of which forms the valve seat.

The valve mechanism comprises a valve disk 6, preferably having a washer 7 affixed thereto, and an arm 8 fixed to the shaft 2 and carrying a head 9 at the outer end, which is connected with the disk 6 by a flexible plate 10. The shaft 2 is actuated from a coin operated mechanism that is connected with an arm 11.

The coin mechanism and its connection with the arm are not material or essential to my invention, and, therefore, I have not shown or described it in detail.

In operation, the movement of the shaft 2 first brings the disk 6 into contact with one edge of the valve ring 5, as shown in Fig. 4, and then gradually forces said disk down onto its seat upon said valve ring, so that the opening therethrough is entirely closed. This relative action is obtained by reason of the yielding connection between the valve disk 6 and head 9. During the closing of the valve a gradually decreasing quantity of gas passes therethrough until the same is entirely shut off by the final and complete contact of the disk with the valve seat.

In the drawings I have shown one of the means for accomplishing the results herein described, but as there are many other ways by which the same result may be obtained, I do not, therefore, limit myself to the exact construction herein shown and described, but claim all that falls fairly within the spirit and scope of my invention.

What I claim as new, and desire to secure by Letters Patent, is:—

In a prepayment gas meter valve, the combination with a casing 1 having a floor with an inclined portion 4 thereon; a valve ring 5 fixed in said inclined portion; a rock shaft 2 rotatably mounted in said casing; a non-flexible valve disk 6 mounted so as to be moved toward and away from said valve seat; an arm 8 fixed to said rock shaft; and a flexible plate 10 bent at substantially a right angle to its length to form two sides, one of said sides being fixed to said valve disk and the other connected with said arm, all constructed and operating substantially as described.

In testimony whereof I affix my signature in presence of two witnesses.

EDWIN A. REEVES.

Witnesses:
GEORGE E. HALL,
FLORENCE H. MONK.